(12) United States Patent
Shimamura

(10) Patent No.: US 8,976,964 B2
(45) Date of Patent: Mar. 10, 2015

(54) KEY PAIR MANAGEMENT METHOD AND IMAGE FORMING DEVICE

(75) Inventor: Katsuya Shimamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 204 days.

(21) Appl. No.: 13/599,443

(22) Filed: Aug. 30, 2012

(65) Prior Publication Data

US 2013/0051557 A1 Feb. 28, 2013

(30) Foreign Application Priority Data

Aug. 31, 2011 (JP) ................................ 2011-189517

(51) Int. Cl.
*H04K 1/00* (2006.01)
*G06F 21/60* (2013.01)
*H04L 9/08* (2006.01)
*H04L 29/06* (2006.01)
(Continued)

(52) U.S. Cl.
CPC ............ *G06F 21/608* (2013.01); *H04L 9/0891* (2013.01); *H04L 9/08* (2013.01); *H04L 9/0825* (2013.01); *H04L 63/0442* (2013.01); *H04L 9/0894* (2013.01); *H04L 9/3263* (2013.01); *H04L 9/30* (2013.01)
USPC ............ 380/255; 380/277; 380/278; 713/151; 713/168; 713/171

(58) Field of Classification Search
CPC ........... H04L 9/00; H04L 9/08; H04L 9/0891; H04L 9/30; H04L 9/0894; H04L 9/0825; H04L 9/3263; H04L 63/0442; G06F 21/608
USPC ........... 380/255, 277, 278; 713/151, 168, 171
See application file for complete search history.

(56) References Cited

U.S. PATENT DOCUMENTS

| 5,224,163 | A | * | 6/1993 | Gasser et al. | 380/30 |
| 5,796,840 | A | * | 8/1998 | Davis | 705/51 |
| 6,978,017 | B2 | * | 12/2005 | Wiener et al. | 380/30 |

(Continued)

FOREIGN PATENT DOCUMENTS

| EP | 1249964 A2 | 10/2002 |
| JP | 2004-282657 A | 10/2004 |

(Continued)

OTHER PUBLICATIONS

Extended European Search Report dated Mar. 14, 2014.

(Continued)

*Primary Examiner* — Jeffrey Pwu
*Assistant Examiner* — Jayesh Jhaveri
(74) *Attorney, Agent, or Firm* — Harness, Dickey & Pierce, P.L.C.

(57) ABSTRACT

In a key pair management method for use in an image forming device, one or more key pairs which are usable for secure communication between the image forming device and an external device are stored into a first area of a memory. A key pair required for the secure communication with the external device is received from the first area of the memory. After the key pair is received from the first area of the memory, the key pair required for the secure communication with the external device is generated in an asynchronous mode and stored into the first area of the memory again. The secure communication between the image forming device and the external device is performed using the key pair received from the first area of the memory.

6 Claims, 10 Drawing Sheets

(51) Int. Cl.
*H04L 9/32* (2006.01)
*H04L 9/30* (2006.01)

(56) References Cited

U.S. PATENT DOCUMENTS

| | | | |
|---|---|---|---|
| 7,305,547 B2* | 12/2007 | Musa | 713/155 |
| 7,366,906 B2 | 4/2008 | Enokida | |
| 7,778,422 B2* | 8/2010 | Freeman et al. | 380/278 |
| 8,015,393 B2 | 9/2011 | Fukasawa | |
| 2001/0050990 A1* | 12/2001 | Sudia | 380/286 |
| 2002/0164035 A1 | 11/2002 | Yokota et al. | |
| 2003/0105963 A1* | 6/2003 | Slick et al. | 713/171 |
| 2003/0110376 A1* | 6/2003 | Wiener et al. | 713/158 |
| 2004/0109568 A1 | 6/2004 | Slick et al. | |
| 2005/0182710 A1* | 8/2005 | Andersson et al. | 705/39 |
| 2005/0228986 A1* | 10/2005 | Fukasawa et al. | 713/156 |
| 2010/0180123 A1* | 7/2010 | Kopetz | 713/176 |
| 2011/0093710 A1* | 4/2011 | Galvin et al. | 713/169 |
| 2012/0137282 A1* | 5/2012 | Illowsky et al. | 717/177 |
| 2012/0204032 A1* | 8/2012 | Wilkins et al. | 713/170 |

FOREIGN PATENT DOCUMENTS

| | | |
|---|---|---|
| JP | 2004-320728 | 11/2004 |
| JP | 2005-303676 | 10/2005 |
| JP | 2006-228146 A | 8/2006 |
| JP | 2011-189517 A | 9/2011 |

OTHER PUBLICATIONS

Japanese Office Action for corresponding Japanese Patent Application No. 2011-189517 issued on Jan. 6, 2015.

* cited by examiner

KEY PAIR MANAGEMENT METHOD AND IMAGE FORMING DEVICE

BACKGROUND OF THE INVENTION

1. Field of the Invention

The present disclosure relates to a key pair management method and an image forming device which are adapted to manage a key pair for use in secure communications.

2. Description of the Related Art

In recent years, when secure communication between an image forming device and an external device, such as a PC (personal computer), is performed, a key pair in a public key cryptographic system is often used in order to protect the data for authentication of the identity of a communication partner and the data generated by encryption. It is known that, in order to secure the safety of the secure communication, it is necessary to generate a key pair having a key length that is larger than a fixed number of bits.

For example, there is a known cryptographic system. In the cryptographic system, when a printing device is powered on, it is determined whether data of a key pair within the printing device exists. If no key pair data exists, a key pair is generated and stored in the printing device. If the key pair data exists, it is further determined whether a secret key data is damaged. If the secret key data is damaged, a new key pair is generated again and the secret key data is updated. For example, see Japanese Laid-Open Patent Publication No. 2005-303676.

However, it is also known that the time for generating a key pair in a public key cryptographic system is increased in proportion to the increase in the key length of the key pair. Hence, if the key length of the key pair is increased to ensure the safety of the secure communication, the time for generating the key pair of the public key cryptographic system is further increased.

For example, in a case in which a key pair of a public key cryptographic system within an image forming device does not exist, secure communication cannot be initiated until the generation of the key pair of the public key cryptographic system is completed. There is a problem in that, if the key length is increased in order to ensure the safety of the secure communication, the time for generating the key pair of the public key cryptographic system is increased and the waiting time for the start of the secure communication is also increased.

SUMMARY OF THE INVENTION

In one aspect, the present disclosure provides a key pair management method and an image forming device which are able to shorten the waiting time to the start of the secure communication.

In an embodiment which solves or reduces one or more of the above-mentioned problems, the present disclosure provides a key pair management method for use in an image forming device, the key pair management method including: a storage step of storing one or more key pairs which are usable for secure communication between the image forming device and an external device into a first area of a memory; a receiving step of receiving a key pair required for the secure communication with the external device from the first area of the memory; a managing step of generating the key pair required for the secure communication with the external device in an asynchronous mode after the key pair is received, and storing the generated key pair into the first area of the memory again; and a communication step of performing the secure communication between the image forming device and the external device using the key pair received from the first area of the memory.

Other objects, features and advantages of the present disclosure will become more apparent from the following detailed description when read in conjunction with the accompanying drawings.

BRIEF DESCRIPTION OF THE DRAWINGS

FIG. 6 is a flowchart for explaining a procedure performed by the image forming device of the present embodiment when the image forming device is powered on.

DETAILED DESCRIPTION OF THE PREFERRED EMBODIMENTS

A description will be given of embodiments of the present disclosure with reference to the accompanying drawings.

Figure 1:
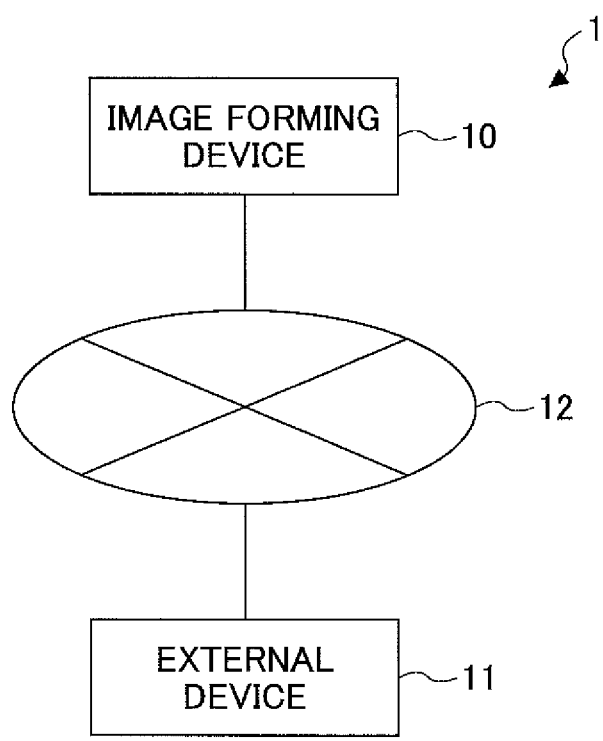
FIG. 1 is a diagram showing a secure communication system to which an image forming device of an embodiment of the present disclosure is applied.

FIG. 1 is a diagram showing a secure communication system to which an image forming device of an embodiment of the present disclosure is applied. As shown in FIG. 1, in the secure communication system 1, an image forming device 10 and an external device 11 are connected via a network 12, such as the Internet or a LAN (local area network). The image forming device 10 and the external device 11 are examples of the devices in the secure communication system 1, which interactively carry out secure communication therebetween. For example, the image forming device 10 may be one of a printer, a scanner device, and a multi-function peripheral. The external device 11 may be one of a PC (personal computer), a server, and a personal digital assistant. In the secure communication system 1 of FIG. 1, a single image forming device 10 and a single external device 11 are included. Alternatively, plural image forming devices 10 and plural external devices 11 may be included.

The secure communication system 1 of FIG. 1 may perform not only the secure communication between the image forming device 10 and the external device 11, but also secure communication between two image forming devices 10 in the secure communication system 1 and secure communication between two external devices 11 in the secure communication system 1.

Figure 2:
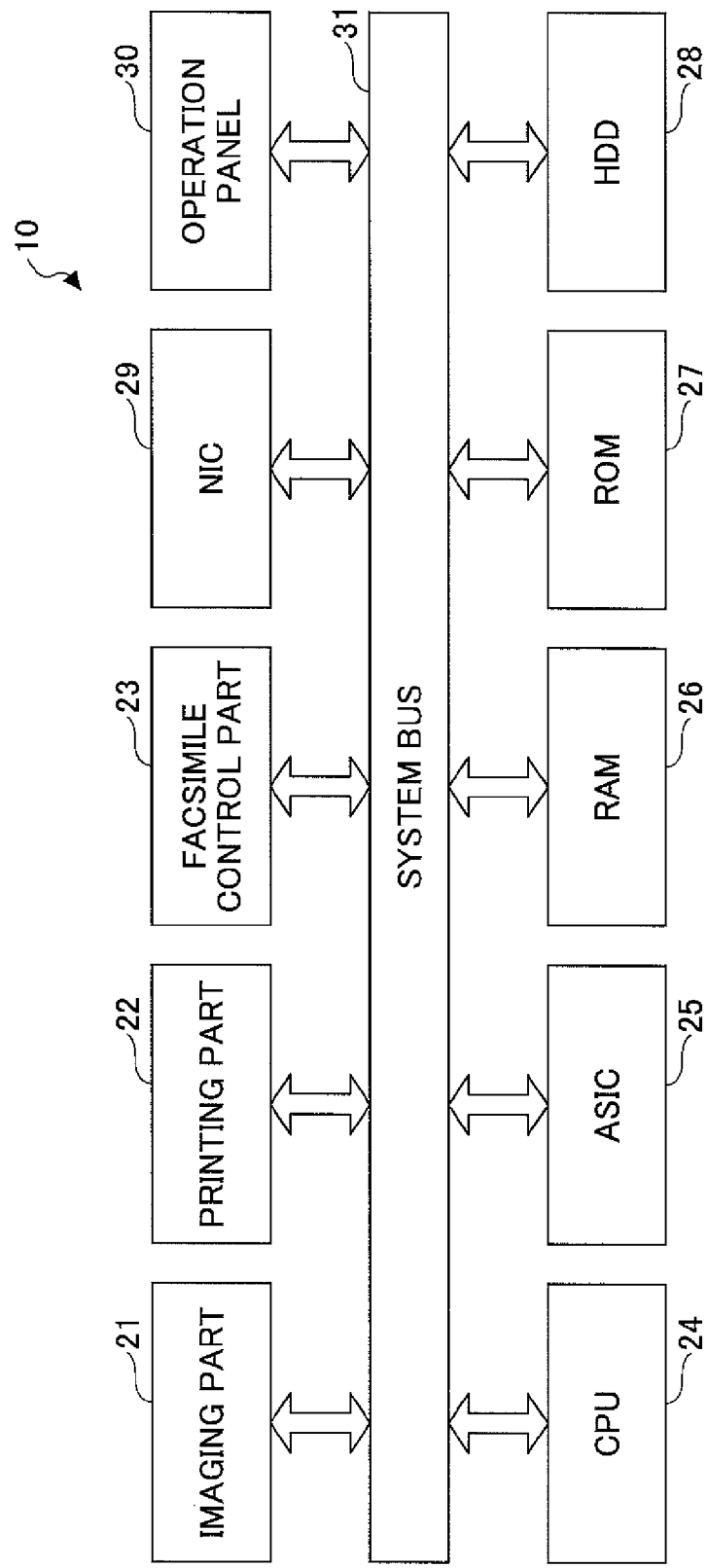
FIG. 2 is a block diagram showing the hardware composition of an image forming device of an embodiment of the present disclosure.

FIG. 2 shows the hardware composition of an image forming device of an embodiment of the present disclosure. As shown in FIG. 2, the image forming device 10 generally includes an imaging part 21, a printing part 22, a facsimile control part 23, a CPU (central processing unit) 24, an ASIC (application-specific integrated circuit) 25, a RAM (random access memory) 26, a ROM (read-only memory) 27, a HDD (hard disk drive) 28, an NIC (network interface card) 29, and an operation panel 30, which are interconnected by a system bus 31.

The imaging part 21 is an image pick-up device which optically reads an image from an original document. The printing part 22 is a device which prints an image on a print sheet. The facsimile control part 23 is a control device for controlling a facsimile. The CPU 24 is an integrated circuit for performing various information processing functions. The ASIC 25 is an integrated circuit for performing various image processing functions. The RAM 26 is a memory device (volatile memory) of the image forming device 10. The ROM 27 is a memory device (non-volatile memory) of the image forming device 10.

The HDD 28 is a storage device of the image forming device 10. The NIC 29 is a communication device arranged as a network interface of the image forming device 10. The operation panel 30 is an operation/display device arranged as a user interface of the image forming device 10.

Programs, including a key pair managing program of an embodiment of the present disclosure, other application programs, and the operating system, are stored in the ROM 27 or the HDD 28. In the following, it is supposed that each of various processing functions according to the embodiments of the present disclosure is performed by the CPU 24 in accordance with the programs stored in the ROM 27 or the HDD 28 and loaded onto the RAM 26, unless otherwise designated.

Figure 3:
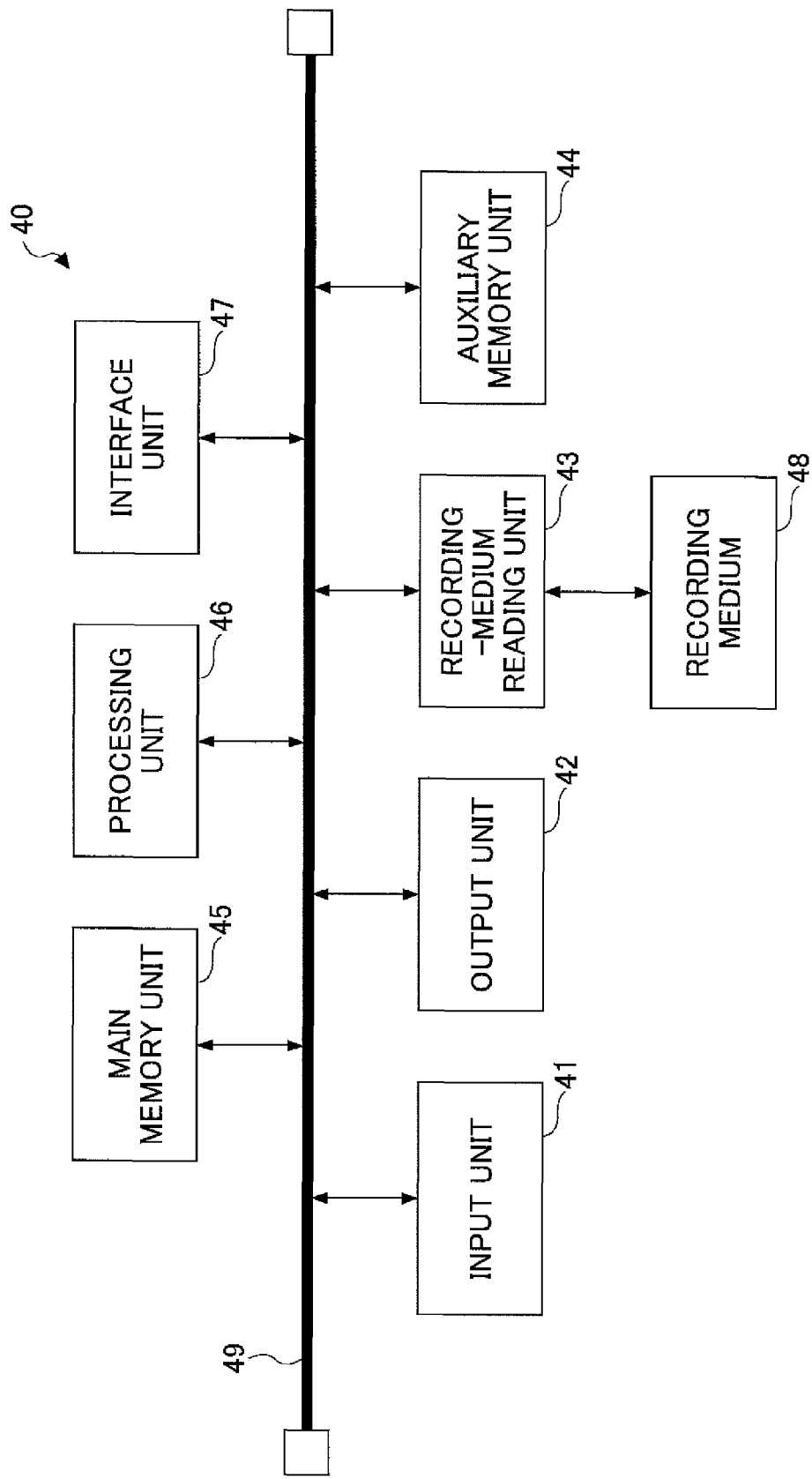
FIG. 3 is a block diagram showing the hardware composition of an external device in the secure communication system.

FIG. 3 shows the hardware composition of an external device in the secure communication system. As shown in FIG. 3, the external device in this embodiment has the hardware composition that is the same as that of a PC (personal computer) 40.

The PC 40 generally includes an input unit 41, an output unit 42, a recording-medium reading unit 43, an auxiliary memory unit 44, a main memory unit 45, a processing unit 46, and an interface unit 47, which are interconnected by a bus 49.

The input unit 41 includes a keyboard, a mouse, etc. For example, the input unit 41 is used to receive various input signals. The output unit 42 includes a display unit, a printer unit, etc. For example, the output unit 42 is used to display various windows, data, etc. on the display unit. The interface unit 47 includes a modem, a LAN card, etc. For example, the interface unit 47 is used to connect the PC 40 with the network 12, such as the Internet or the LAN.

The key pair managing program to be installed in the external device 11 is at least a part of the various programs which control the PC 40. For example, the key pair managing program may be installed in the external device 11 by inserting a recording medium 48 with the key pair managing program recorded therein into the recording-medium reading unit 43, or by downloading the key pair managing program via the network 12.

The recording medium 48 may be any of recording media of various types including recording media which optically, electrically or magnetically record information, such as a CD-ROM, a flexible disk and a magneto-optic disk, and semiconductor memories which electrically record information, such as a ROM and a flash memory, etc.

By inserting in the recording-medium reading unit 43 the recording medium 48 with the key pair managing program recorded therein, the key pair managing program from the recording medium 48 is installed in the auxiliary memory unit 44 through the recording-medium reading unit 43. Alternatively, the key pair managing program may be downloaded via the network 12 to the PC 40 and installed in the auxiliary memory unit 44 through the interface unit 47.

In the auxiliary memory unit 44, the key pair managing program and necessary files and data are stored. Upon starting of the key pair managing program, the key pair managing program is read from the auxiliary memory unit 44 and stored in the main memory unit 45 for execution of the key pair managing program. The processing unit 46 performs various processing functions in accordance with the key pair managing program stored in the main memory unit 45.

Next, the various processing functions performed by the image forming device 10 in accordance with the key pair managing program will be described. Processing functions performed by the external device 11 in accordance with the key pair managing program are essentially the same as those of the image forming device 10, and a description thereof will be omitted in the following.

Figure 4:
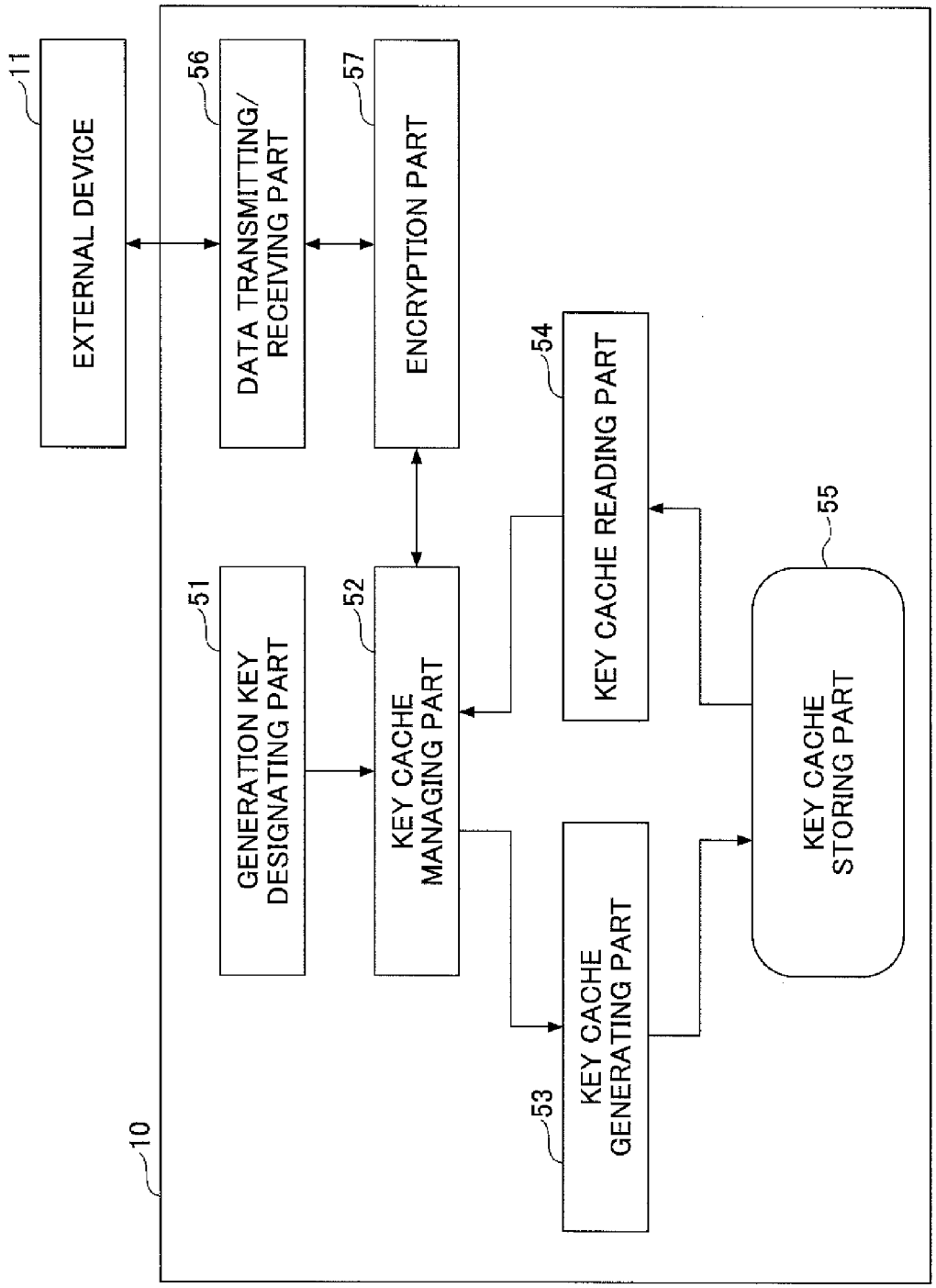
FIG. 4 is a block diagram showing the software composition of the image forming device of the present embodiment.

FIG. 4 is a block diagram showing the software composition of the image forming device of the present embodiment. Specifically, a key pair cache system provided in the image forming device 10 is illustrated in FIG. 4. In FIG. 4, other blocks of the image forming device which are unnecessary for explanation of the processing functions of the key pair managing program of the present embodiment are omitted for the sake of convenience.

As shown in FIG. 4, the image forming device 10 includes a generation key designating part 51, a key cache managing part 52, a key cache generating part 53, a key cache reading part 54, a key cache storing part 55, a data transmitting/receiving part 56, and an encryption part 57.

A storage unit in the image forming device according to the present disclosure is equivalent to the key cache storing part 55 in this embodiment. A management unit in the image forming device according to the present disclosure is equivalent to the key cache managing part 52 in this embodiment. A communication unit in the image forming device according to the present disclosure is equivalent to the data transmitting/receiving part 56 and the encryption part 57 in this embodiment.

Referring to FIG. 4, the key cache storing part 55 stores one or more key pairs usable for secure communication in a key cache area of the memory. The one or more key pairs of all key types (communication protocols, key lengths, etc.) which are usable for secure communication when the image forming device is normally powered on are stored in the key cache area.

The generation key designating part 51 designates a key type of a key pair of the public key cryptographic system used for secure communication. The key cache managing part 52 manages the key pairs stored in the key cache area. The key cache managing part 52 performs a control function to select from among the key pairs stored in the key cache area a key pair of the key type designated by the generation key designating part 51. The key cache managing part 52 manages the key type of a key pair which is generated and stored in the key cache area.

The key cache generating part 53 is caused to generate a key pair and store the generated key pair into the key cache area under the control of the key cache managing part 52. The key cache reading part 54 is caused to read a key pair from the key cache area under the control of the key cache managing part 52.

The data transmitting/receiving part 56 is arranged to perform secure communication between the image forming device 10 and the external device 11. The encryption part 57 is arranged to perform authentication and encryption of a communication partner required for secure communication when the data transmitting/receiving part 56 performs the secure communication with the external device 11. The encryption part 57 receives from the key cache managing part 52 the key pair used for the authentication and encryption of the communication partner.

Figure 5:
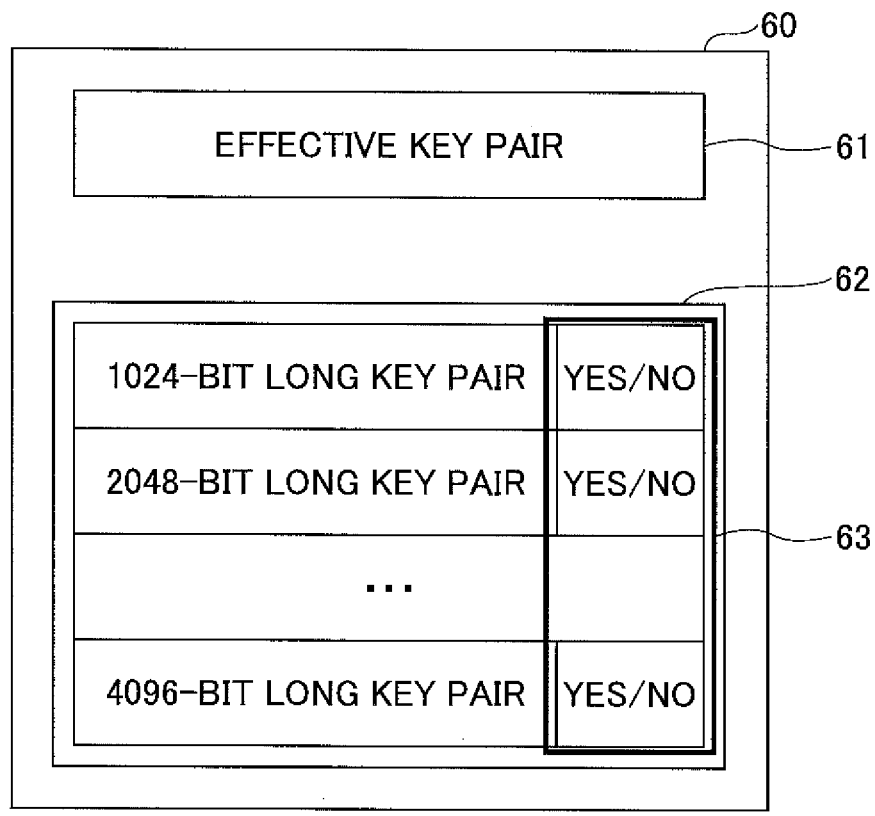
FIG. 5 is a diagram showing a key pair area including a key cache area in a key cache storing part of the image forming device of the present embodiment.

FIG. 5 is a diagram showing a key pair area 60 including a key cache area 62 in the key cache storage part of the image forming device of the present embodiment.

A first area of a memory in the image forming device according to the present disclosure is equivalent to the key cache area 62 of the key pair area 60 in the key cache storage part 55 of this embodiment. A second area of the memory in the image forming device according to the present disclosure is equivalent to an effective key pair area 61 of the key pair area 60 of the memory in the key cache storage part 55 of this embodiment.

As shown in FIG. 5, the key pair area 60 includes an effective key pair area 61 where a currently effective key pair is stored, and a key cache area 62 where one more key pairs usable are stored beforehand.

In the key cache area 62, a generation-state flag 63 is assigned for each key type of the key pairs stored therein. In the embodiment shown in FIG. 5, the generation-state flag 63 which is set to "NO" indicates that the key pair of the corresponding key type is not yet generated, and the generation-state flag 63 which is set to "YES" indicates that the key pair of the corresponding key type is already generated. Alternatively, the generation-state flag 63 may be modified to further indicate that the key pair of the corresponding key type is in progress of generation.

Figure 6:
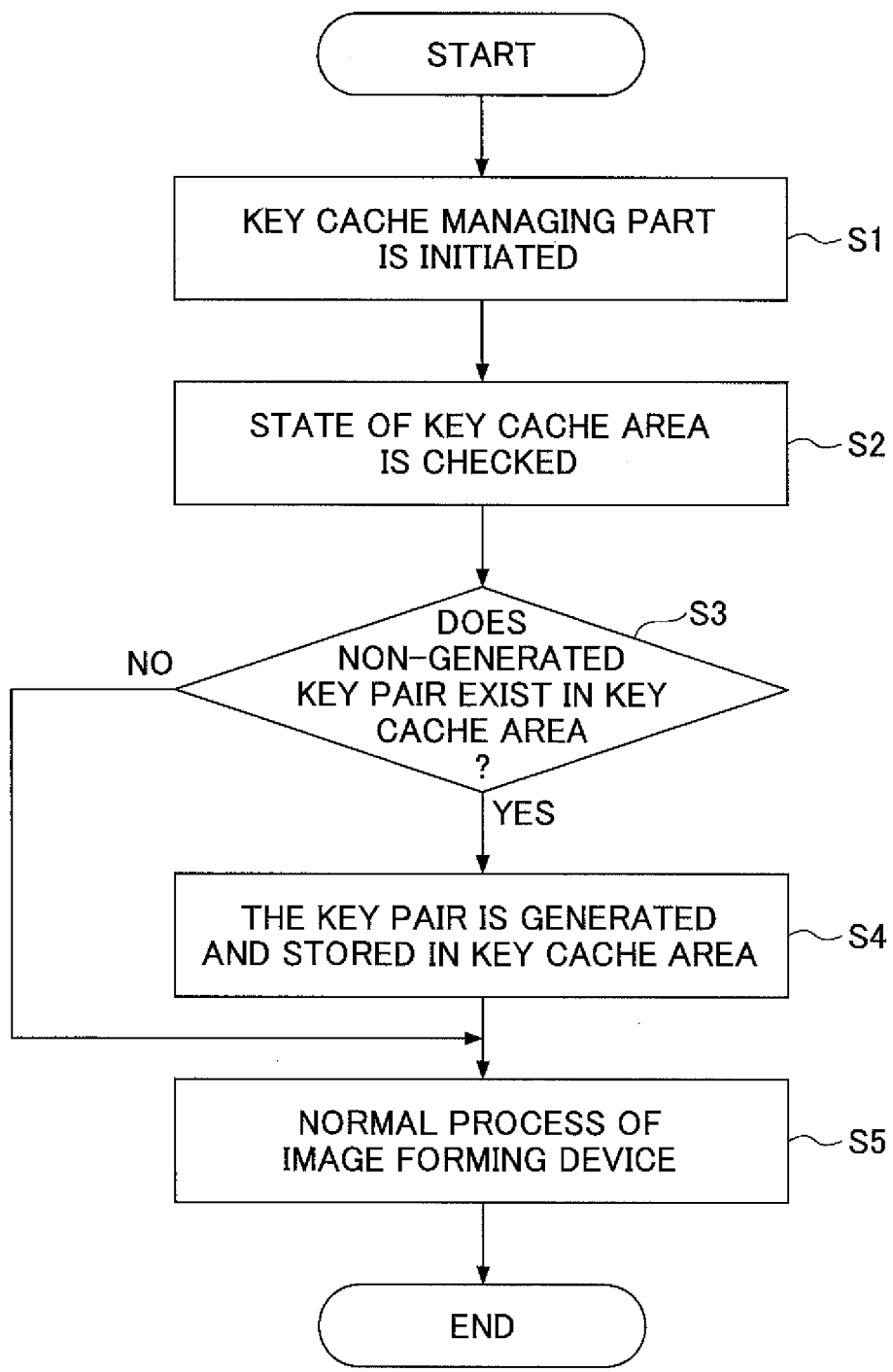

FIG. 6 is a flowchart for explaining a procedure performed by the image forming device when the image forming device is powered on.

As shown in FIG. 6, the procedure is started when the image forming device 10 is powered on. In step S1, the key cache managing part 52 is initiated to perform the management of the key pair area 60. In step S2, the key cache managing part 52 checks the generation state of each of the key pairs stored beforehand in the key cache area 62, by reading the corresponding one of the flags 63.

In step S3, the key cache managing part 52 determines whether a non-generated key pair exists among the key pairs stored beforehand in the key cache area 62. When it is determined that a non-generated key pair exists, the procedure proceeds to step S4. In step S4, the key cache managing part 52 causes the key cache generating part 53 to generate the non-generated key pair in an asynchronous mode with respect to execution of a normal processing function of the image forming device 10. After the step S4 is performed, the procedure proceeds to step S5. In step S5, the image forming device 10 performs the normal processing function.

On the other hand, when it is determined in the step S3 that a non-generated key pair does not exist, the procedure proceeds to step S5. In this case, in step S5, the image forming device 10 performs the normal processing function without performing the step S4.

In this embodiment, the generation of the non-generated key pair is performed in an asynchronous mode, and the image forming devices 10 can quickly start performing a normal processing function other than the generation of the non-generated key pair, without awaiting an end of the generation of the non-generated key pair. Because the generation of the non-generated key pair is performed in an asynchronous mode, the generation of the non-generated key pair may be finished even during running of the normal processing function by the image forming device 10.

Figure 7:
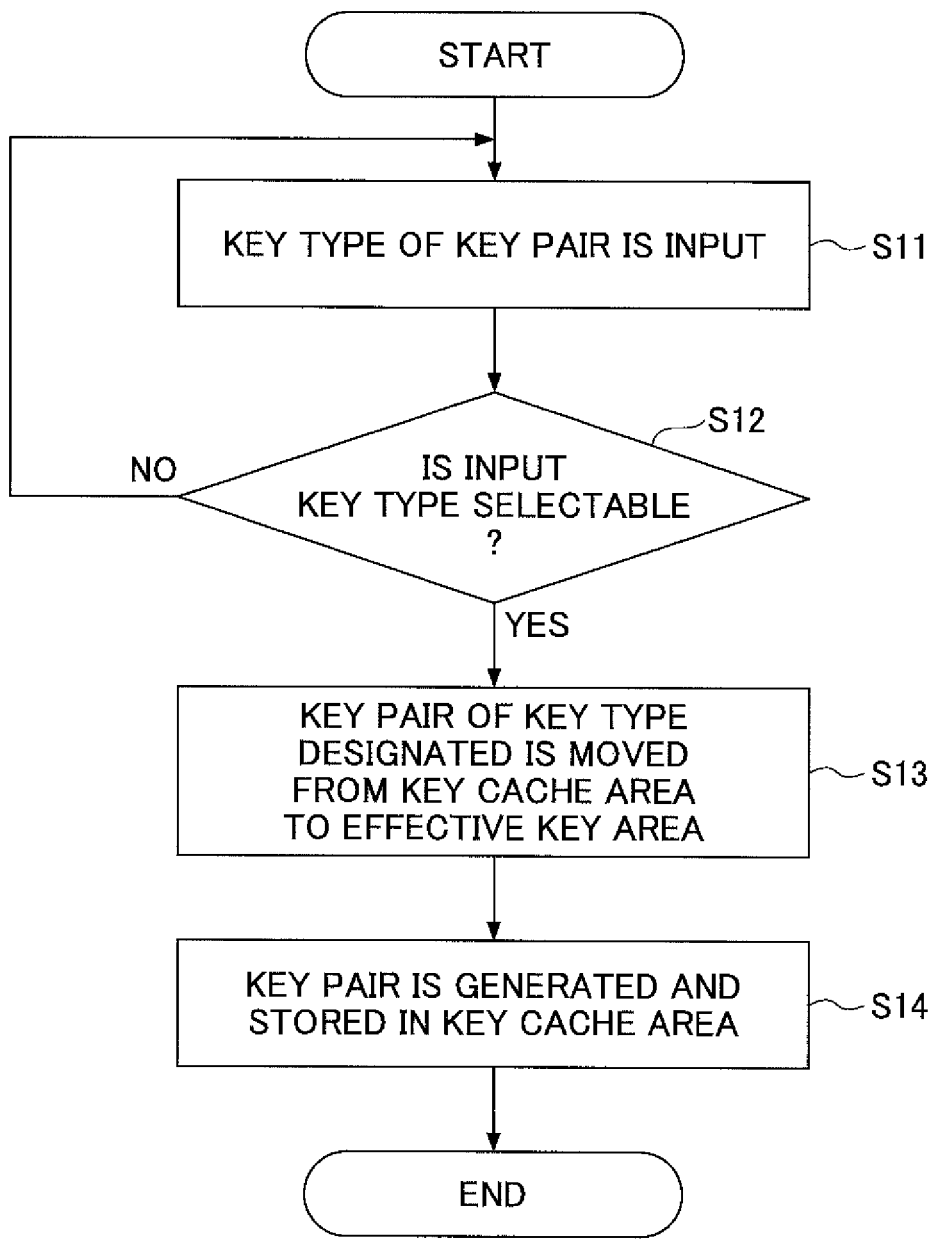
FIG. 7 is a flowchart for explaining a key pair selection procedure performed by the image forming device of the present embodiment.

FIG. 7 is a flowchart for explaining a key pair selection procedure performed by the image forming device of the present embodiment.

As shown in FIG. 7, in step S11, an operator (user) of the image forming device 10 inputs a key type of the key pair to be used for secure communication by using the operation panel 30 (input screen) of the image forming device 10.

In step S12, the generation key designating part 51 checks the key type of the key pair input by the user. If the key length or the algorithm of the public key cryptographic system, which cannot be used or is not recommended for the normal secure communication is designated by the user, the generation key designating part 51 determines that an improper key pair (improper key) was designated, and the control is returned to the step S11, in which the user is again prompted to input a key type of the key pair.

If the key length or the algorithm of the public key cryptographic system, which cannot be used or is not recommended for the normal secure communication is not designated, the generation key designating part 51 determines that a selectable key pair (selectable key) was designated, and the procedure proceeds to step S13.

In step S13, the key cache managing part 52 moves the key pair (which is of the key type designated at the step S11) from the key cache area 62 to the effective key pair area 61. In step S14, the key cache managing part 52 generates, in an asynchronous mode, the key pair which has been moved to the effective key pair area 61, and stores the generated key pair in the key cache area 62 again.

Figure 8:
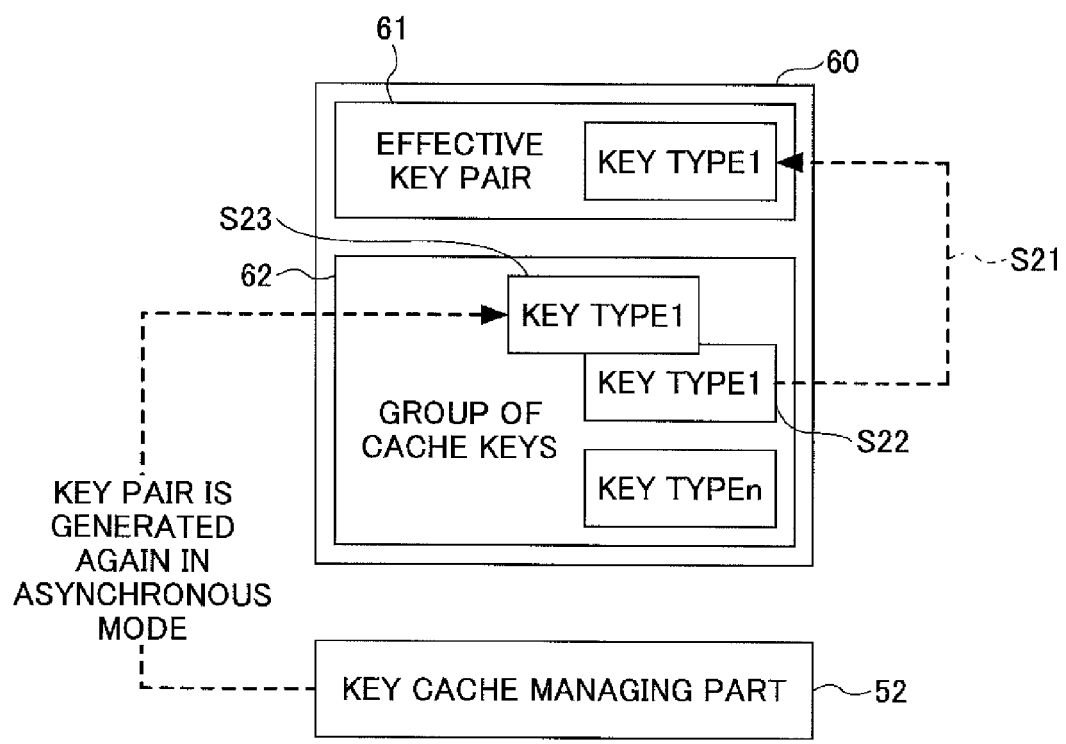
FIG. 8 is a diagram showing an example of a state transition of the key pair area in the key cache storing part of the image forming device of the present embodiment.

FIG. 8 is a diagram showing an example of a state transition of the key pair area in the key cache storage part of the image forming device of the present embodiment.

In the example of FIG. 8, a state transition of the key pair area 60 when "key type1" is selected as a key type of a key pair to be used for secure communication is illustrated. As shown in FIG. 8, in step S21, the key cache managing part 52 moves the key pair of the key type "key type1" selected by the user from the key cache area 62 to the effective key pair area 61.

Subsequently, in step S22, the key cache managing part 52 temporarily deletes the key pair "key type1" (which has been moved from the key cache area 62 to the effective key pair area 61) in the key cache area 62. In step S23, the key cache managing part 52 generates in an asynchronous mode the key pair "key type1" (which has been deleted from the key cache area 62) and stores the generated key pair in the key cache area 62.

Figure 9:
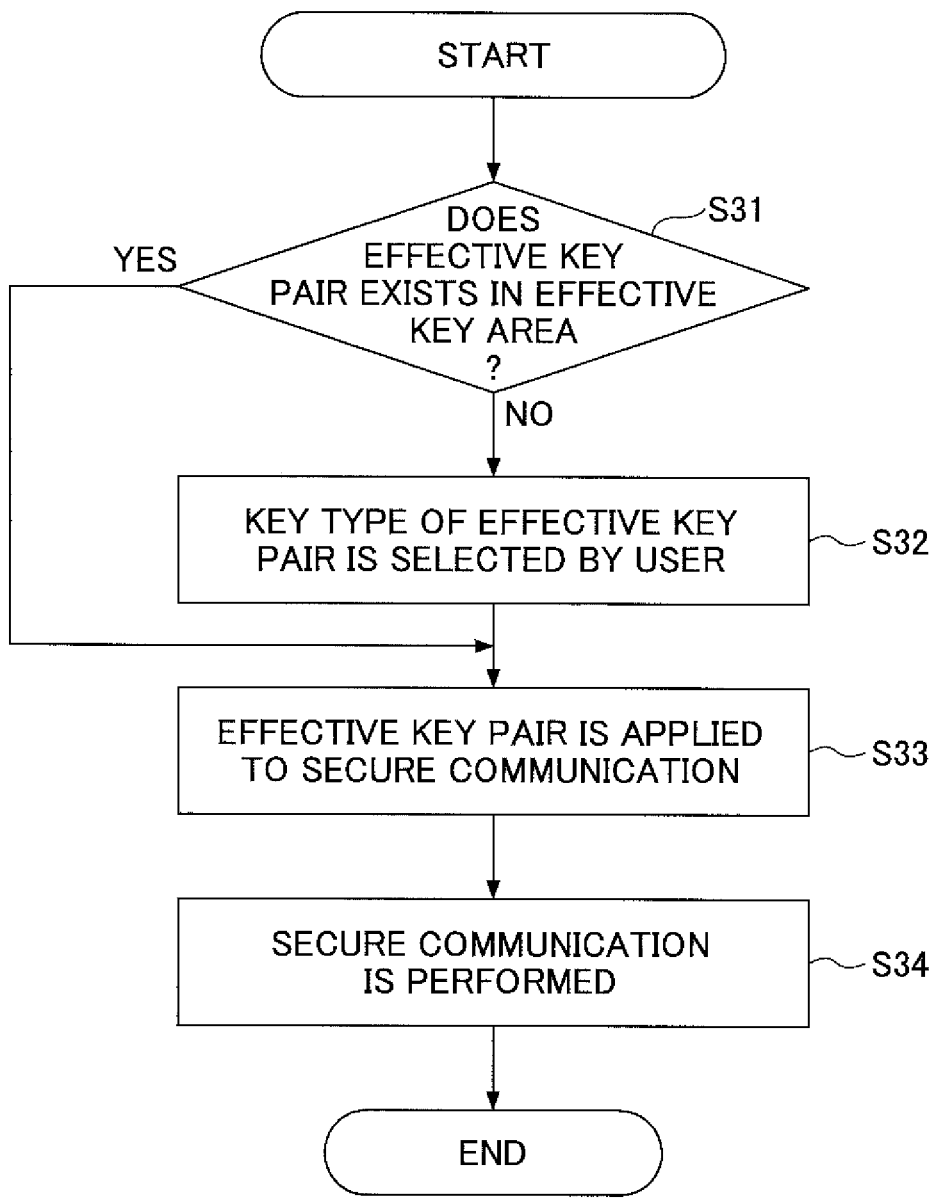
FIG. 9 is a flowchart for explaining a secure communication procedure using an effective key pair.

FIG. 9 is a flowchart for explaining a secure communication procedure using an effective key. In the present embodiment, an effective key is a key pair stored in the effective key pair area 61.

As shown in FIG. 9, in step S31, the key cache managing part 52 checks the presence of an effective key in the effective key pair area 61.

When an effective key exists in the effective key pair area 61 (YES of step S31), the procedure proceeds to step S33. In step S33, the key cache managing part 52 transmits the effective key to the encryption part 57 and the encryption part 57 applies the received effective key to the secure communication.

In step S34, the data transmitting/receiving part 56 and the encryption part 57 perform the secure communication between the image forming device 10 and the external device 11 using the effective key.

On the other hand, when no effective key exists in the effective key pair area 61 (NO of step S31), the procedure proceeds to step S32. In step S32, the generation key designating part 51 prompts the user to designate a key type of the key pair to be used for secure communication by using the operation panel 30 of the image forming device 10. The key cache managing part 52 moves the key pair of the designated key type from the key cache area 62 to the effective key pair area 61.

Also, in this case, the key cache managing part 52 transmits the effective key in the effective key pair area 61 to the encryption part 57 and the encryption part 57 applies the received effective key to the secure communication in the step S33. The data transmitting/receiving part 56 and the encryption part 57 perform the secure communication between the image forming device 10 and the external device 11 using the effective key in the step S34.

Figure 10:
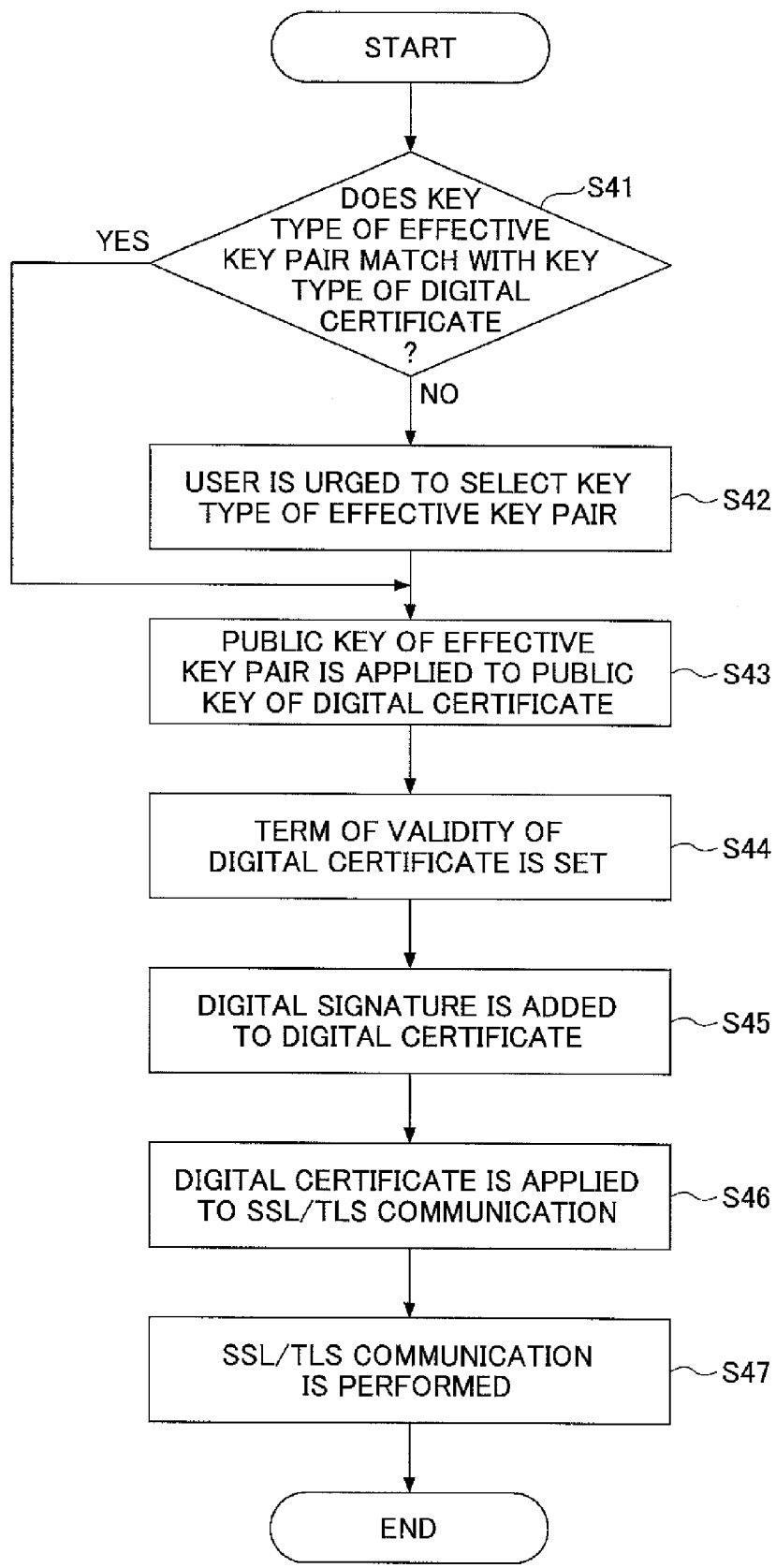
FIG. 10 is a flowchart for explaining an SSL/TLS communication procedure using a digital certificate.

FIG. 10 is a flowchart for explaining an SSL/TLS communication procedure using a digital certificate. To generate a digital certificate required for SSL/TLS communication, the key pair of the effective key is used. The SSL/TLS communication using a digital certificate is illustrated as an example of authentication of a communication partner.

As shown in FIG. 10, in step S41, the key cache managing part 52 checks an effective key. The checking of an effective key here is to detect whether an effective key exists in the effective key pair area 61, and detect whether a key type of the effective key matches with a key type of a digital certificate.

When an effective key exists and the key type of the effective key matches with the key type of the digital certificate (YES of step S41), the procedure proceeds to step S43. In step S43, the key cache managing part 52 transmits the effective key to the encryption part 57 and the encryption part 57 applies a public key contained in the effective key to a public key of the digital certificate.

On the other hand, when an effective key does not exist or a key type of the effective key does not match with the key type of the digital certificate (NO of step S41), the procedure proceeds to step S42. In step S42, the generation key designating part 51 prompts a user to select an effective key from the key cache area 62. Subsequently, the key cache managing part 52 transmits the selected effective key to the encryption part 57 and the encryption part 57 applies a public key contained in the effective key to the public key of the digital certificate in the step S43. Further, in the step S43, the encryption part 57 sets the public key contained in the effective key in the digital certificate and generates a before-signature digital certificate.

In step S44, the encryption part 57 sets up a term of validity of the digital certificate before signature based on a security policy. In step S45, the encryption part 57 adds a digital signature to the before-signature digital certificate by accessing a certificate authority (CA) and generates the digital certificate.

When an external certificate authority is used, a secret key held by the external certificate authority is used to generate a digital signature. When a digital signature is added by the image forming device itself as a certificate authority, a secret key contained in the key pair of the effective key is used.

In step S46, the encryption part 57 applies the generated digital certificate to the SSL/TLS communication. In step S47, the data transmitting/receiving part 56 and the encryption part 57 perform the SSL/TLS communication using the generated digital certificate.

In the present embodiment, one or more key pairs of the public key cryptographic system usable for secure communication are stored beforehand in the key cache area 62 for each key length and for each algorithm of the public key cryptographic system. It is no longer necessary to generate a key pair immediately before starting the secure communication. Thus, it is possible to shorten the waiting time to the start of the secure communication.

In the present embodiment, a key pair required for secure communication is selected from the key pairs stored in the key cache area 62, and the secure communication can be carried out without awaiting the completion of generation of the key pair. The key pair selected from the key cache area 62 is automatically generated in an asynchronous mode. Even when the same key pair is needed later, the corresponding key pair can be selected from the key cache area 63. Therefore, according to the present embodiment, it is possible to shorten the waiting time to the start of the secure communication.

In the present embodiment, even when generation of a digital certificate is required as in SSL/TLS communication, a key pair required for generation of the digital certificate can be selected from the key cache area 62 and the digital certificate can be generated without awaiting the completion of generation of the key pair.

In the present embodiment, the key pairs stored in the key cache area 62 are not held in the form of a digital certificate with the term of validity set up, and there is no need to take into consideration the term of validity with respect to the key pairs stored in the key cache area 62.

As described in the foregoing, according to the present disclosure, it is possible to provide a key pair management method and an image forming device which are able to shorten the waiting time to the start of secure communication.

The key pair management method which is adapted to manage the key pair for use in the secure communication according to the present disclosure is not limited to the foregoing embodiments, and variations and modifications may be made without departing from the scope of the present disclosure.

The present application is based upon and claims the benefit of priority of the prior Japanese patent application No. 2011-189517, filed on Aug. 31, 2011, the contents of which are incorporated herein by reference in their entirety.

What is claimed is:

1. A key pair management method for use in an image forming device, comprising:
   determining, when powering on the image forming device, whether key pairs for each of a plurality of key pair types have been generated and stored in a first area of a memory, the plurality of key pair types each being usable for secure communication between the image forming device and an external device;
   generating one or more key pairs corresponding respectively to each of one or more non-generated key pair types, non-generated key pair types being key pair types, from among the plurality or key pair types, for which the determining step determined a key pair has not yet been generated;
   storing the one or more generated key pairs in the first area of the memory;
   receiving input information identifying a key pair type selected for a first secure communication session with the external device from the first area of the memory;

obtaining a key pair, from among generated key pairs stored in the first area of the memory, having the selected key pair type; and initiating the first secure communication session between the image forming device and the external device using the obtained key pair.

2. The key pair management method according to claim 1, wherein, at least one of the one or more key pairs corresponding respectively to each of one or more non-generated key pair types is generated in an asynchronous mode and stored in the first area of the memory.

3. The key pair management method according to claim 1, wherein, in the obtaining operation, the obtained key pair is moved from the first area of the memory to a second area of the memory, and the obtained key pair is a key pair that was generated in an asynchronous mode and stored in the first area of the memory.

4. The key pair management method according to claim 1, wherein, in the initiation operation includes using, for authentication and encryption of a communication partner, the selected key pair.

5. A non-transitory computer-readable recording medium storing a key pair managing program which, when executed by a computer, causes the computer to perform key pair management operations for use in an image forming device, the key pair management operations comprising:

determining, when powering on the image forming device, whether key pairs for each of a plurality of key pair types have been generated and stored in a first area of a memory, the plurality of key pair types each being usable for secure communication between the image forming device and an external device;

generating one or more key pairs corresponding respectively to each of one or more non-generated key pair types, non-generated key pair types being key pair types, from among the plurality or key pair types, for which the determining step determined a key pair has not yet been generated;

storing the one or more generated key pairs in the first area of the memory;

receiving input information identifying a key pair type selected for a first secure communication session with the external device from the first area of the memory;

obtaining a key pair, from among the one or more generated key pairs stored in the first area of the memory, having the selected key pair type; and initiating the first secure communication session between the image forming device and the external device using the obtained key pair.

6. An image forming device comprising:

a processor; and a memory storing instructions that, when executed by the processor, cause the processor to implement:

a management unit configured to, determine, when powering on the image forming device, whether key pairs for each of a plurality of key pair types have been generated and stored in a first area of a memory, the plurality of key pair types each being usable for secure communication between the image forming device and an external device, and generate one or more key pairs corresponding respectively to each of one or more non-generated key pair types, non-generated key pair types being key pair types, from among the plurality or key pair types, for which the determining step determined a key pair has not yet been generated, a storage unit configured to store the one or more generated key pairs in the first area of the memory, the management unit being further configured to, receive input information identifying a key pair type selected for a first secure communication session with the external device from the first area of the memory, and obtain a key pair, from among the one or more generated key pairs stored in the first area of the memory, having the selected key pair type; and a communication unit configured to initiate the first secure communication session between the image forming device and the external device using the obtained key pair.

\* \* \* \* \*